Dec. 12, 1967     J. J. McCARTHY     3,357,736
VEHICLE SEAT
Filed May 17, 1966     6 Sheets-Sheet 2

INVENTOR.
JOHN J. McCARTHY
ATTORNEYS

Dec. 12, 1967  J. J. McCARTHY  3,357,736
VEHICLE SEAT
Filed May 17, 1966  6 Sheets-Sheet 3

INVENTOR.
JOHN J. McCARTHY
BY
ATTORNEYS

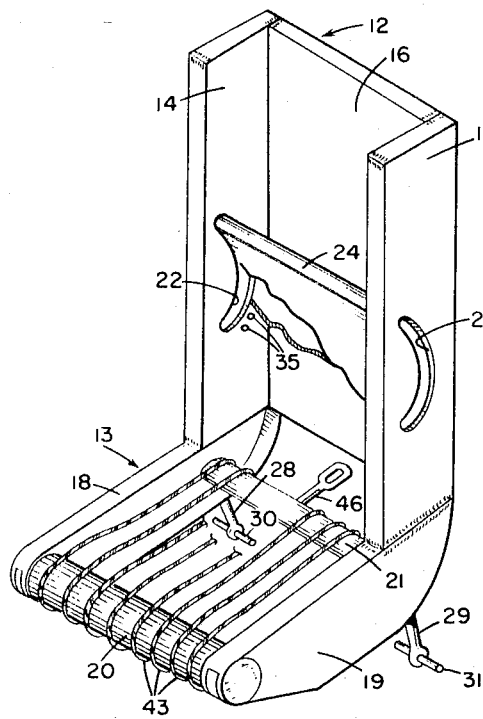

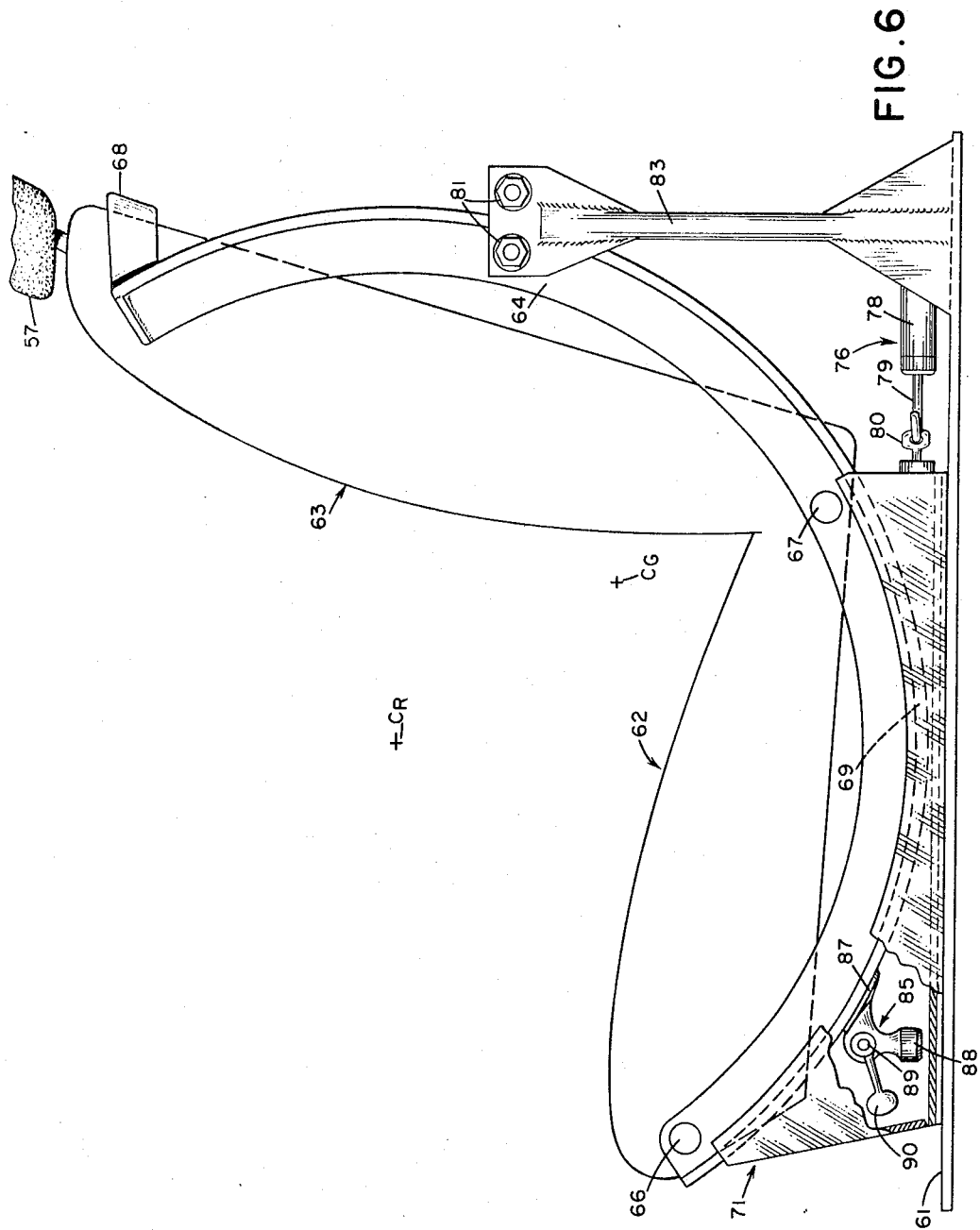

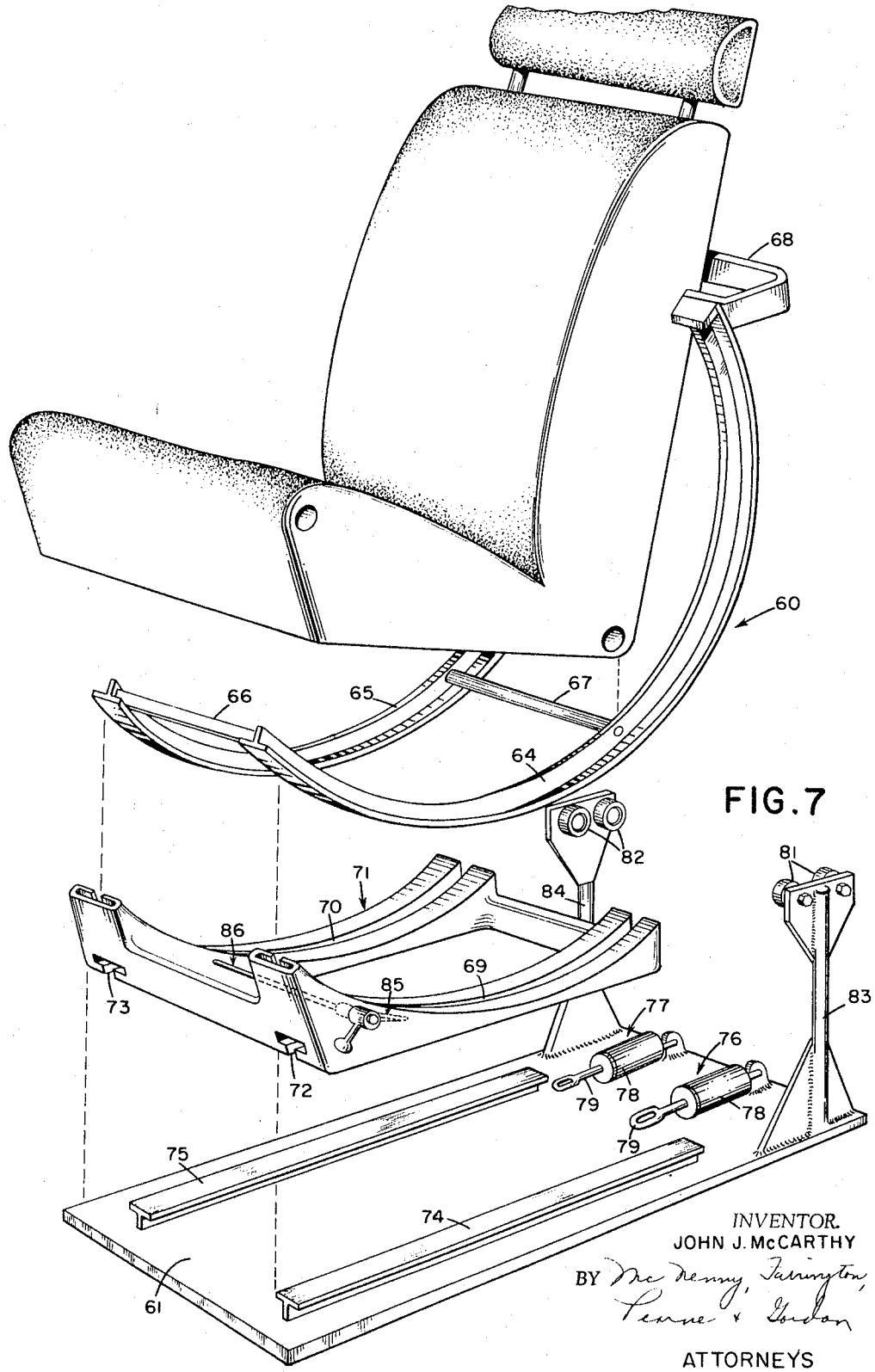

United States Patent Office 3,357,736
Patented Dec. 12, 1967

3,357,736
VEHICLE SEAT
John J. McCarthy, 2097 Riverside Drive,
Lakewood, Ohio 44107
Filed May 17, 1966, Ser. No. 550,826
12 Claims. (Cl. 296—65)

ABSTRACT OF THE DISCLOSURE

A safety and comfort seat for a vehicle having a supporting structure for the seat which orients the seat from a substantially upright position to a reclined position upon the sudden and violent deceleration of the vehicle.

---

This invention relates to vehicles seats and, more particularly, to a comfort and safety seat for a vehicle such as an automobile which may be adjusted to any one of a number of upright and reclined positions and which will orient the passenger to a safe position when the vehicle is suddenly and violently decelerated prior to or during a collision.

Various attempts have been made to protect the driver and the passengers in an automobile by providing means which will restrain the occupants of the vehicle so that the occupants will decelerate in a controlled manner into cushioning or restraining means and not into the steering wheel, windshield, dashboard, or other rigid parts of the automobile.

The most widely accepted procedure for restraining the passengers during a collision is the provision of a lap restraint or seat belt in the automobile. While such a device may prevent the passenger from being ejected from the automobile during a collision, the lap belt permits the occupant of a vehicle to pivot forwardly at the waist and strike his head on the dashboard, the windshield, or even the roof of the car.

In order to overcome this pivoting action, shoulder harnesses have been proposed which are intended to restrain the upper torso of the passenger in his seat. Such shoulder harnesses, however, are often cumbersome to put on and, even if a vehicle is provided with such harnesses, the occupant of the vehicle may not use them.

As an ancillary means to block the forward travel of the occupant of a vehicle, seats have been designed to tilt backwardly prior to a collision so that the seat bottom will be more or less perpendicular to the direction of vehicle travel. Some of these safety seats are triggered by a linkage which is connected to the front bumper to tilt the seat in the manner indicated above. Other such seats are tilted by the passenger prior to an impending collision. Neither of these proposals has been acceptable since the bumper linkage mechanism frequently jams upon vehicle impact so that the seat will not be tilted in the contemplated manner and a passenger may not react quickly enough prior to the collision or, in fact, may not even be aware of an impending collision.

It is therefore an object of the present invention to provide a safety seat which will tilt backwardly so that the seat bottom or deck is substantially perpendicular to the direction of impact and will be caused to tilt in this manner by the inertia of the seat and its occupant during deceleration to a sudden stop which exceeds a predetermined deceleration.

It is a more particular object of the present invention to provide a safety seat for a vehicle which is mounted in guide track means and is movable between a first position in which the seat is upright and a second position wherein the seat deck or bottom is more nearly vertical than horizontal and which will be caused to move from the first to the second position only when the deceleration of the vehicle exceeds a predetermined maximum deceleration during a sudden stop.

It is a further object of this invention to provide a safety seat for a vehicle which will tilt backwardly prior to a collision and decelerate the passenger in a controlled manner by predetermined bending action of certain components of the safety seat assembly and by absorbing the deceleration of the passenger in the bottom of the seat.

It is a further object of the present invention to provide a safety seat for a vehicle which will protect the occupant of the seat during head-on, rear-end, and lateral collisions, and which will retain the occupant during vehicle roll-over.

It is a still further object of this invention to provide a safety seat for a vehicle which will tilt backwardly prior to a collision and which will decelerate the occupant of the seat by permitting the buttocks of the occupant to pass through the seat bottom so that the occupant assumes a protective fetal position during the peak moment of impact.

According to one aspect of this invention, a comfort and safety seat for a vehicle is provided which comprises a seat having back and bottom portions. The back portion of the seat has a curved guide track extending therethrough and a horizontal bar extends through the curved guide track and is perpendicular to the normal direction of vehicle travel. The ends of the bar are mounted on vertical cantilever beams which are, in turn, fixed relative to the frame of the vehicle. The bottom portion of the seat is mounted in a linear guide track means which extends in the normal direction of travel. The linear guide track permits the bottom of the seat to move forwardly while the back and bottom of the seat are tilted backwardly.

According to another aspect of this invention, the seat is fixed between two wheels. Each wheel is fixed to an axis and each axis is rotatably mounted on a vertical cantilever beam so that the combined center of gravity of the seat and its occupant is below the axis of rotation of the wheels. When a predetermined deceleration obtains, the static friction between a brake and the wheel rim is overcome to permit the wheel to rotate so that the seat is tilted backwardly. When the seat completes its rotational movement, the cantilever beams may bend to decelerate the seat occupant in a controlled manner.

According to a further aspect of the invention, arcuate tracks are fixed to the sides of a seat. The tracks are slidably mounted in a guide means which permits rotation of the seat about a center of rotation. The combined center of gravity of the seat and its occupant is located below the center of rotation so that the seat will tip backwardly when a predetermined deceleration is attained. The guide means, according to this aspect of the invention, includes a vertical cantilever which permits the rotational movement of the seat and may bend to decelerate the seat occupant in a controlled manner.

These and other objects, features, and advantages of the invention will become more fully apparent from the following detailed description and from the accompanying drawings.

In the drawings:

FIG. 5 is a perspective view of the framework and reinforcing members of the comfort and safety seat illustrated in FIGS. 1–4, with portions broken away for clarity;

FIG. 6 is a side elevational view of a comfort and safety seat according to a further aspect of this invention, with portions of the safety seat assembly broken away for clarity;

FIG. 7 is an exploded perspective view of the comfort and safety seat illustrated in FIG. 6;

FIG. 8 is an exploded perspective view of a comfort and safety seat base which may be employed with the seat illustrated in FIG. 7;

FIG. 9 is a side elevational view of a comfort and safety seat according to a still further aspect of this invention; and FIG. 10 is a front elevational view of the seat illustrated in FIG. 9.

Figure 1:
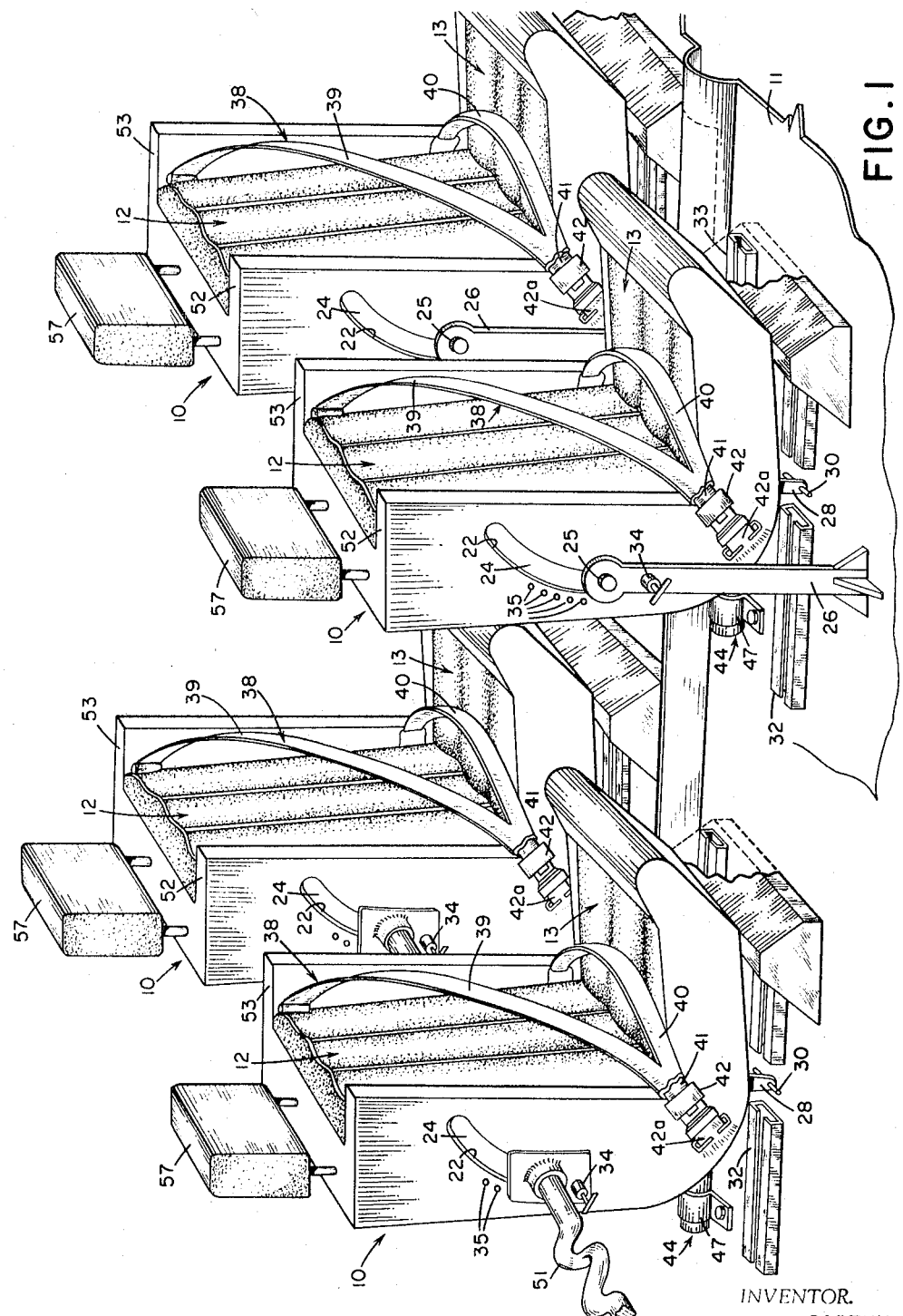
FIG. 1 is a perspective view of a plurality of comfort and safety seats according to one aspect of this invention, showing the safety seats mounted as a unit on a support member.

Referring now to the drawings, and particularly to FIGS. 1 through 5, a safety seat 10 is illustrated. As is shown in FIG. 1, a plurality of safety seats 10 may be mounted on a base member 11, which may comprise a steel plate so that the safety seats may be installed in existing automobiles as a unit. Each safety seat 10 includes a back portion 12 and a seat or deck portion 13.

The back portion 12 of the seat 10 comprises a pair of parallel side plates 14 and 15 (FIG. 5), which are joined by a back plate 16. The bottom or deck portion 13 of the seat 10 comprises a pair of parallel side plates 18 and 19 which are welded to the side plates 14 and 15 respectively, and are joined by a front crossbar 20 and a rear crossbar 21. The side plates 14 and 15 are provided with identical slots 22 and 23 respectively, and the slots 22 and 23 are joined by a channel member 24 which has vertical cross sections that correspond to the shape of the slots 22 and 23.

The slots 22 and 23 and the tube 24 comprise a curved guide track through which a bar 25 extends. The bar 25 is fixed at its ends by a pair of cantilever beams 26. The seat bottom is supported by a pair of T-bars 28 and 29, which are respectively welded to the side plates 18 and 19. Each T-bar 28 and 29 has a cylindrical crosspiece 30 and 31 which are respectively mounted in channel guide tracks 32 and 33 respectively.

Figure 2:
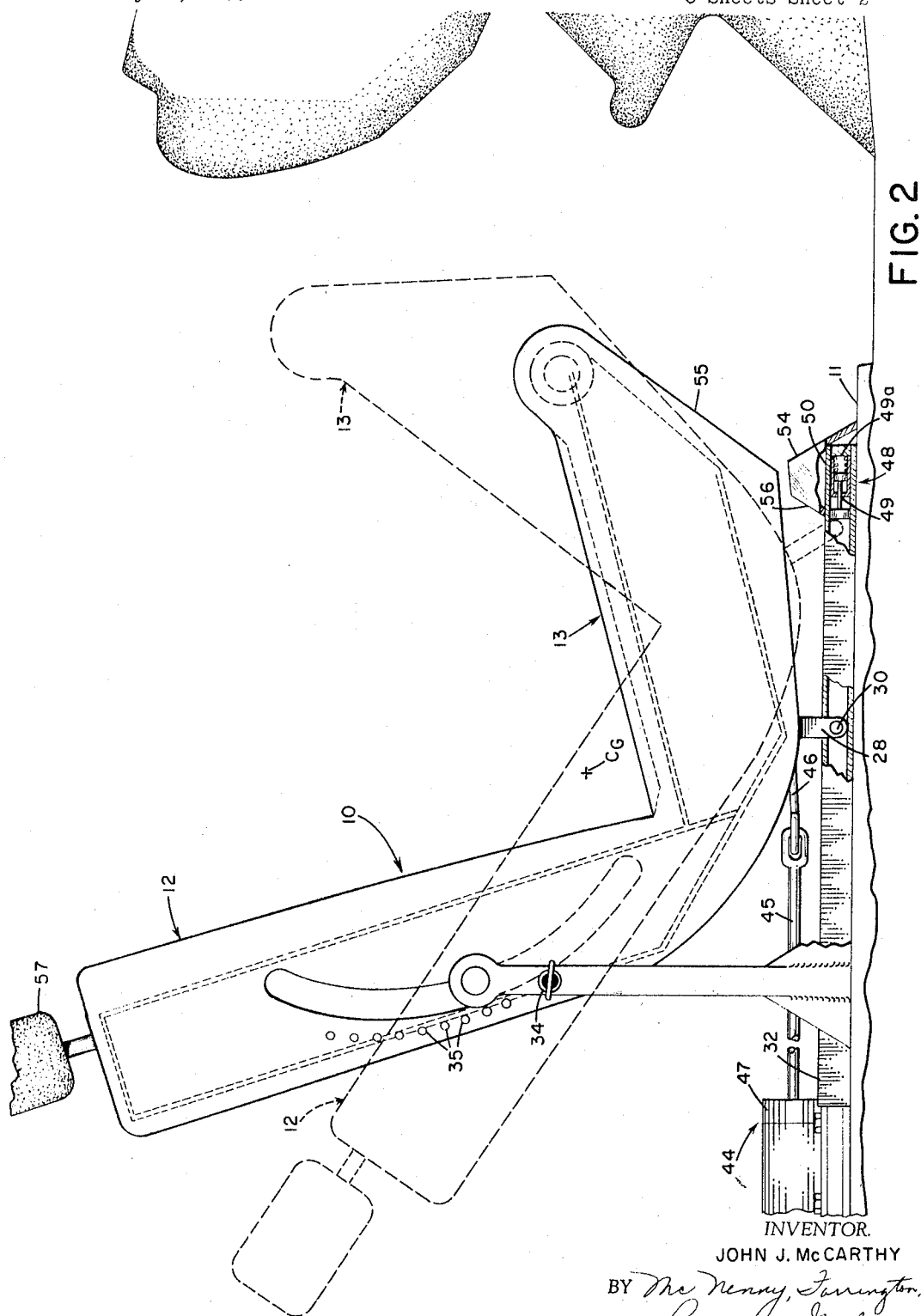
FIG. 2 is a side elevational view of a comfort and safety seat according to this invention, with portions of the seat assembly broken away for clarity.
Figure 3:
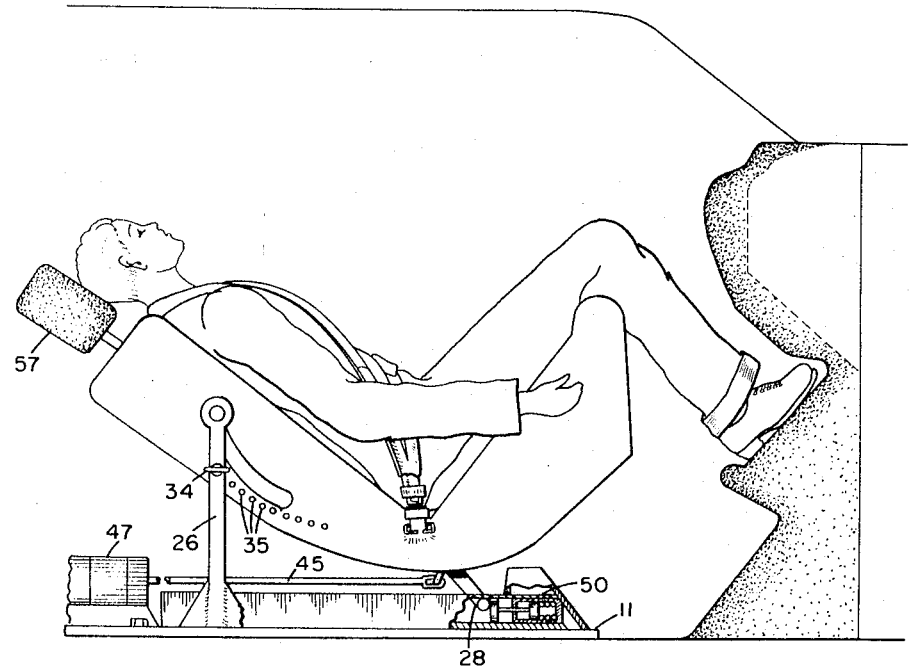
FIG. 3 is a side elevational view of the seat shown in FIG. 2, but showing the position of the seat during sudden and excessive deceleration or impact.
Figure 4:
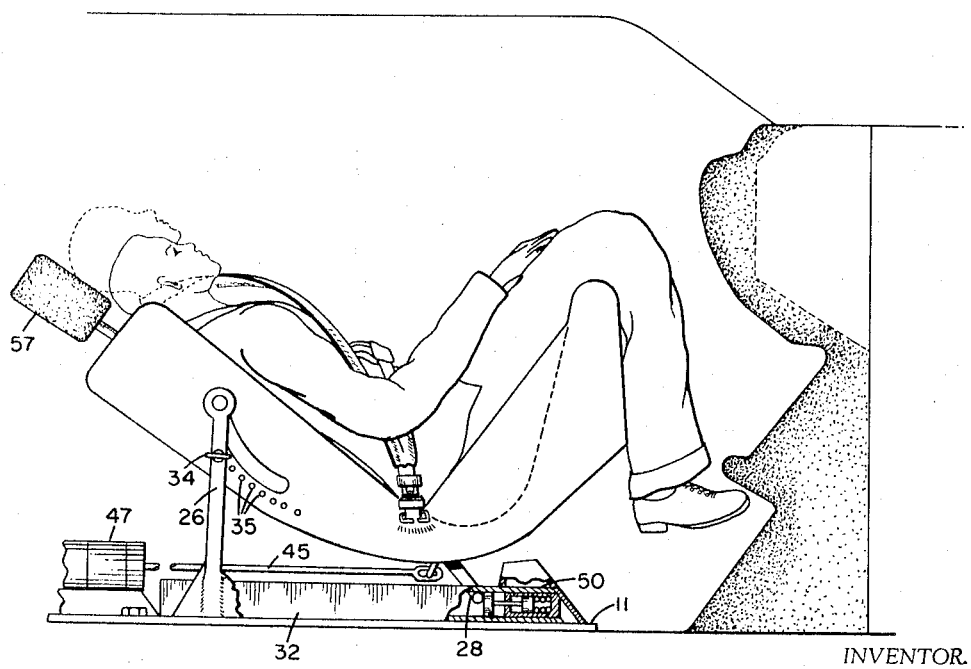
FIG. 4 is a side elevational view of the comfort and safety seat illustrated in FIGS. 2 and 3, but showing the position of the seat and its occupant during the latter stages of seat occupant deceleration.

The safety seat 10 is movable from a first position shown in solid outline in FIG. 2, to a second position shown in phantom outline in FIG. 2. During its travel from the first position to the second position, the crosspieces 30 and 31 guide the bottom of the seat 10 toward the front of the vehicle, and the curved guide track, which is defined by the tube 24 and the slots 22 and 23, guides the back portion 12 of the seat 10 downwardly. The crosspieces 30 and 31 permit the seat to tilt backwardly during this travel, so that the seat is guided into a position wherein the bottom or deck portion 13 of the seat is more nearly vertical than horizontal.

The seat 10 is normally retained in the position illustrated in solid outline in FIG. 2 by a shear pin 34 which extends through the beam 26 and into one of a series of apertures 35 in the side plate 14. The shear pin 34 is biased inwardly by a spring (not shown) and, if desired, the seat may be adjusted to a variety of reclining positions for comfort by withdrawing the pin 34 and inserting it in another aperture 35.

The occupant of the seat is securely contained in the seat 10 by a safety harness and lap belt 38, which includes a shoulder strap 39 which is fixed at one end to an upper portion of the side plate 15 and a lap belt 40 which is fixed at one end to a lower portion of the side plate 15. The shoulder strap 39 and the lap belt 40 are joined to each other at their other ends, and a belt fastening member 41 is attached to the joined ends. The belt fastening member 41 cooperates with a conventional coupling element 42 which is secured to the end of a rigid strap 42a.

The safety seat 10 is upholstered in a conventional manner. The seat portion 13 is provided with stretchable, non-resilient lattice members 43 (FIG. 5) which extend between the crossbars 20 and 21. The lattice members 43 are preferably fabricated from a material which will yield past its elastic limit without any substantial degree of springback. The material may be rubber-impregnated nylon cords.

A conventional retarding device 44 is provided and the retarding device 44 comprises a nylon cord 45 which is attached to an I-bolt 46 which is fixed to the crossbar 21. The cord 45 is attached at its other end to a conventional self-winding reel 47 and the reel 47 has a braking means (not shown) to retard the withdrawal of the cord 45 from the reel 47.

There is provided at the forward end of each track a stop member 48 which comprises a projecting ram 49 which is slidably mounted in a cylinder 50. A coil 49a is mounted within the cylinder behind the ram 49. The coil is formed from malleable metal which will yield past its elastic limit and which has relatively no springback.

With the occupant securely fastened in the seat 10, the center of gravity $C_G$ of the seat 10 and the occupant is located below the bar 25. Thus, if the vehicle is drastically decelerated, the center of gravity of the seat 10 and its occupant tends to travel forwardly, and if this forward travel exceeds the strength of the shear pin 34, the shear pin will be severed and the seat 10 will travel forwardly and tilt backwardly to the position shown in phantom outline in FIG. 2. During this travel, the seat is decelerated by the retarding device 44, the stop member 48, and, ultimately, by the cantilevers 26. The final deceleration of the occupant is controlled by the cantilevers 26 in that they will bend when the upper portion of the guide track strikes the bar 25. Prior to or during the final increments of deceleration of the seat 10, the lattice members 43 stretch to permit the buttocks of the occupant of the seat to project through the deck portion 13. Thus, the occupant of the seat 10 will be caused to assume the protected fetal position shown in FIG. 4.

If desired, the bar 25 may be affixed to upright support members (not shown) which are part of the vehicle frame. Thus, as is shown in FIG. 1, the bar 25, which extends through the back portions 12 of the rear seats 10, may be fixed to the frame of the vehicle. In this instance, however, the bar 25 should be provided with sinusoidal end portions 51 which will be straightened out upon severe deceleration.

The seats 10 may be provided with lateral support wings 52 and 53, which tend to restrain the occupant upon lateral impact and which provide greater comfort to the seat 10.

The safety seat 10 not only restrains the occupant so that he will decelerate in a controlled manner when the vehicle is subjected to a head-on collision, but the seat 10 will also protect and restrain the occupant during a rear-end collision. During such a collision, the center of gravity $C_G$ will tend to rotate the seat clockwise, as viewed in FIG. 2, about the bar 25. This clockwise movement is guided by a housing 54 upon which the forward portion of the deck portion 13 rests. A rear-end collision will tend to drive the tracks 32 and 33 forwardly so that a sloping portion 55 will ride downwardly on a sloping portion 56 of the housing 54. If desired, a second retarding device (not shown) may be provided for each safety seat 10, which will tend to resist and uniformly decelerate this forward movement of the tracks 32 and 33 relative to the seat 10. In this instance, however, the additional retarding device would be positioned opposite the location of the retarding device 47. To further protect the occupant of the seat against whiplash injury during such a rear-end collision, a headrest 57 may be provided.

Referring now to FIGS. 6 and 7, a safety seat 60 according to a further aspect of this invention is illustrated. The safety seat 60 may be mounted on a base plate member 61. The safety seat 60 comprises a bottom or deck portion 62 and an integral back portion 63. The safety seat 60 is mounted between arcuate T-beams 64 and 65 by a front crossbar 66 and a rear crossbar 67, which respectively extend through the front and rear of the bottom or deck portion 62. The upper ends of the T-beams 64 and 65 are joined to each other and to the back portion 63 by a yoke 68.

The T-beams 64 and 65 are arcs of circles having their centers at a center of rotation $C_R$. The T-beams 64 and 65 are respectively mounted in and received by channel tracks 69 and 70 respectively. The channel tracks 69 and 70 are defined by an intermediate base member 71 which has T-shaped longitudinal slots 72 and 73 on its bottom. The T-shaped slots 72 and 73 slidably receive T-bars 74 and 75, which are fixed to the base plate 61. Although the intermediate base member 71 is slidable with respect to the base plate 61, the relative free sliding movement of these members is dampened by a pair of conventional snubbing elements 76 and 77, which are fixed at one end to the base plate 61. The snubbing members 76 and 77 may comprise hollow cylinders 78 having a piston (not shown) slidably mounted therein. The cylinders 78 may be filled with an incompressible fluid such as oil and the pistons may divide these cylinders into a pair of oil-filled chambers. Orifices (not shown) may extend through each piston so that the piston may move within the cylinder but the motion of the piston will be dampened according to the force applied thereto. Each piston includes a piston rod 79 which extends from one end of each cylinder 78 and is fastened to the intermediate base member 71 by an eye-bolt 80.

An upper portion of each T-beam 64 and 65 is respectively received by a pair of guide rollers 81 and 82. The guide rollers 81 and 82 are mounted at the upper ends of cantilever beams 83 and 84 so that the combined center of gravity $C_G$ of the seat 60 and its occupant is located below the rollers 81 and 82.

The safety seat 60 is normally retained in the position illustrated in FIG. 6 by inertia brakes 85 and 86, which respectively engage the bottom surface of the T-beams 64 and 65. Each inertia brake 85 and 86 comprises a brakeshoe 87, which engages its T-beam 64 and 65. Each brakeshoe 87 is urged into engagement with its T-beam 64 and 65 by a weight 88 which tends to urge each inertia brake 85 in a counterclockwise direction about a connecting shaft 89 to which each inertia brake 85 is fixed. Each brakeshoe 87 is further urged into engagement with its T-beam 64 and 65 by the static friction between each beam 64 and 65 and the brakeshoe 87, since the seat 60 and its occupant have a static force component in a clockwise direction.

The safety seat 60 is, therefore, normally retained in the position shown in FIG. 6, but is movable from that position to any one of a multiplicity of reclined positions by manually releasing the inertia brakes 85 by means of a lever 90 and permitting the seat 60 to recline until the desired position is attained.

With the safety seat 60 in its upright position shown in FIG. 6, and with the occupant of the seat securely strapped in the seat by a lap belt and shoulder harness (not shown), the combined center of gravity $C_G$ of the seat 60 and its occupant is located beneath the center of rotation $C_R$ of the seat 60. The center of rotation $C_R$ is the axis about which the seat rotates as it moves from the position shown in FIG. 6 to a position wherein the bottom portion 62 of the seat is more nearly vertical than horizontal. This center of gravity may be varied by building in weights (not shown) in the back portion of the seat beneath the center of rotation $C_R$.

If the vehicle is drastically decelerated, the combined center of gravity $C_G$ of the seat 60 and its occupant tends to travel forwardly and in an arc. As a result of this drastic deceleration, the weights 88 of the inertia brakes 85 tend to rotate in a clockwise direction to release the brakeshoe 87 from the T-beams 64 and 65 to permit the seat 60 to travel in a clockwise direction. During the latter portions of this arcuate travel, the intermediate base member 71 may travel forwardly and be decelerated by the snubbing devices 78. Under extreme deceleration, the cantilever beams 83 and 84 may be bent and prior to or during the final increments of deceleration of the seat 60, the buttocks of the occupant of the seat may project through the deck portion 62 and the occupant will be caused to assume a protected fetal position similar to the position illustrated in FIG. 4.

Referring now to FIG. 8, a modified intermediate base member 100 is illustrated. The base member 100 may be employed for mounting the safety seat 60, illustrated in FIG. 7. The intermediate base member 100 is provided with a pair of pinch rollers 101 at each of its four corners. The rollers 101 are mounted in bracket members 102 and the rollers 101 receive the T-beams 64 and 65 and guide those beams through an arcuate path. The intermediate base member 100 is also provided with inertia brakes 103 and 104 which respectively engage the T-beams 64 and 65. The bottom of the base 100 is provided with longitudinal T-slots 105 and 106 which engage T-bars 107 and 108. The T-bars 107 and 108 are fixed to a base plate 109 which is similar to the base plate 61 illustrated in FIG. 7. The intermediate base member 100 is fixed to the base 109 by conventional snubbing devices 110 and 111, which may be similar to the snubbing devices 76 and 77 illustrated in FIG. 7.

The upper rear portions of the T-beams 64 and 65 are respectively engaged by rollers 112 and 113, which are respectively fixed to the upper ends of cantilever beams 114 and 115.

Referring now to FIGS. 9 and 10, a safety seat 120 according to a further aspect of this invention is illustrated. The safety seat 120 may be mounted on a base plate member 121. The safety seat 120 comprises a bottom or deck portion 122 and an integral back portion 123. Each side of the safety seat 120 is fixed to a wheel 124 by crossbars 125 and 126 which extend through the bottom portion 122 of the seat. The top of the back portion 123 of the seat is fixed to the wheels by a yoke 127.

The wheels 124 each comprise a rim 128, a plurality of spokes 129, and a hub 130. Each hub 130 is provided with an axle 131 which is rotatably received by an upper end portion of a cantilever beam 132. Each cantilever beam 132 is fixed at its lower end to the base plate 121.

The seat 120 is normally retained in the position illustrated in FIGS. 9 and 10 by friction brakes 133. The friction brakes comprise a brakeshoe 134, which is biased against the rim 128 of each wheel 124 by a relatively strong spring 135.

With the safety seat 120 in its upright position shown in FIGS. 9 and 10, and with the occupant of the seat securely strapped in the seat by a lap belt and shoulder harness (not shown), the combined center of gravity $C_G$ of the seat 120 and its occupant is located beneath the center of rotation $C_R$ of the seat 120. This center of gravity may be varied by building in weights (not shown) in the back bottom portion of the safety seat 120. If the vehicle is drastically decelerated, the center of gravity of the seat 120 and its occupant tends to travel forwardly in an arc. This forward travel is retarded and uniformly decelerated by the friction brakes 133 which bear against each wheel rim 128. During the latter portions of its arcuate travel, the forward inertia of the safety seat may tend to bend the cantilever beams 132 to further decelerate the occupant in a controlled manner.

The safety seats 10, 60, and 120 may be provided with a headrest 140, which will prevent the occupant's head from being thrown back violently during a rear-end collison. Moreover, the safety seats according to this invention will protect the passenger during such rear-end collision by tending to tilt forwardly to decelerate the seat occupant in a controlled manner and prevent the occupant from being thrown rearwardly.

The invention is not restricted to the slavish imitation of each and every one of the details described above, which have been set forth merely by way of example. Obviously, devices may be provided which change, eliminate, or add certain specific details without departing from the invention.

What is claimed is:

1. A safety seat for a vehicle for protecting the occupant of the seat during a sudden stop, comprising a seat mounted on a vehicle floor, said seat having back and bottom portions, said back portion of said seat having means defining a curved guide track along a portion of said back portion, means on the vehicle floor defining a floor mounted guide track for the bottom of the seat, means on said seat cooperating wth the floor mounted track to guide said seat along said track, a vertically extending cantilever beam fixed at its lower end to the frame of the vehicle and having an upper end which cooperates with said curved guide track so that said curved guide track moves in an arcuate path relative to said upper portion of the cantilever beam, said cooperating upper portion of the cantilever beam being positioned above the combined center of gravity of the seat and its occupant, and being adapted to remain in a cooperating relationship with the curved guide track upon the application of a force thereto which will bend the cantilever beam, said seat being movable with its curved guide track relative to the cooperating upper end of said cantilever beam between a first position wherein said seat is upright and a second position wherein the bottom portion of the seat is more nearly vertical than horizontal, the cooperation between the upper portion of the cantilever beam and the curved guide track obtaining when said seat is in its first and second positions so that the cantilever beam may bend when a predetermined force is applied thereto while said seat is in its second position, means retaining said seat in its first position and being releasable when the seat and its occupant are decelerated at a predetermined rate.

2. A safety seat according to claim 1 wherein said curved guide track comprises means defining a circular arc and wherein said upper portion of the cantilever beam includes guide means engaging a portion of said curved guide track.

3. A safety seat according to claim 2 wherein said safety seat is slidably mounted on an intermediate base member for rotation about the center of said arc and wherein said intermediate base member is slidably mounted relative to the vehicle frame for movement in the direction of normal vehicle travel.

4. A safety seat according to claim 3 wherein said curved guide track is slidably mounted for rotation relative to the intermediate base member by roller means engaging said guide track.

5. A safety seat according to claim 3 wherein said intermediate base member is restrained relative to the vehicle frame by decelerating means.

6. A safety seat for a vehicle for protecting the occupant of the seat during a sudden stop, comprising a seat mounted on a vehicle floor, said seat having back and bottom portions, said back portion of said seat having means defining a curved guide track along a portion of said back portion, means on the vehicle floor defining a floor mounted guide track for the bottom of the seat, means on said seat cooperating with the floor mounted track to guide said seat along said track, rigid guide means cooperating with said curved guide track, said rigid guide means being securely fastened to said vehicle, said seat being movable along the curved guide track relative to said rigid guide means between a first position wherein said seat is upright and a second position wherein the bottom portion of the seat is more nearly vertical than horizontal, means retaining said seat in its first position and being releasable when the seat and its occupant are decelerated at a predetermined rate, said rigid guide means being positioned above the combined center of gravity of the seat and an occupant in said seat so that said seat will assume said second position when said seat and its occupant are decelerated at said predetermined rate, the rigid guide means and the curved guide track being adapted to remain in their cooperating relationship upon the application of a force thereto which will bend a portion of the rigid guide means, the cooperation between the rigid guide means and the curved guide track obtaining when said seat is in its first and second positions so that a portion of the rigid guide means may bend when a predetermined force is applied thereto while said seat is in its second position.

7. A safety seat for a vehicle for protecting the occupant of the seat during a sudden stop, comprising a seat mounted on a vehicle floor, said seat having back and bottom portions, said back portion of said seat having a guide track therethrough, means on the vehicle floor defining a floor mounted guide track for the bottom of the seat, means on said seat cooperating with the floor mounted track to guide said seat along said track, a substantially horizontal bar extending through said guide track substantially perpendicular to the normal direction of travel of said vehicle, retaining means securely fastening the ends of said bar to the vehicle, said seat being movable about said guide bar between a first position wherein said seat is upright and a second position wherein the bottom portion of the seat is more nearly vertical than horizontal with the bar adjacent one end of the track and with the bar absorbing forward movement of the seat, means retaining said seat in its first position and being releasable when the seat and its occupant are decelerated at a predetermined rate, said bar being positioned above the combined center of gravity of the seat and an occupant in said seat so that said seat will assume said second position when said seat and its occupant are decelerated at said predetermined rate.

8. A safety seat according to claim 1 wherein said floor mounted guide track comprises a linear guide track which extends in the normal direction of travel of said vehicle, said floor mounted guide track permitting pivotal movement of said seat relative to said linear guide track.

9. A safety seat according to claim 6 wherein said curved guide track is arcuate and extends along a portion of said bottom portion of the seat.

10. A safety seat according to claim 6 wherein the bottom of said seat is yieldable to permit the occupant to be driven into said bottom when said predetermined deceleration rate is exceeded and when said seat is in its second position.

11. A safety seat according to claim 6 wherein said rigid guide means includes a vertical cantilever beam.

12. A safety seat according to claim 11 wherein said vertical cantilever beam is fixed at its lower end to a base plate and wherein said base plate is mounted on the floor of the vehicle.

References Cited

UNITED STATES PATENTS 2,818,909   1/1958   Burnett _____ 296—65

FOREIGN PATENTS 1,214,385   4/1960   France.

LEO FRIAGLIA, *Primary Examiner.*

BENJAMIN HERSH, *Examiner.*

L. D. MORRIS, *Assistant Examiner.*